US012572294B2

(12) United States Patent
Ahn

(10) Patent No.: US 12,572,294 B2
(45) Date of Patent: Mar. 10, 2026

(54) ELECTRIC DEVICE AND METHOD FOR EMULATING A NON-VOLATILE MEMORY

(71) Applicant: HYUNDAI AUTOEVER CORP., Seoul (KR)

(72) Inventor: Min-Ho Ahn, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 125 days.

(21) Appl. No.: 18/078,560

(22) Filed: Dec. 9, 2022

(65) Prior Publication Data

US 2023/0214144 A1     Jul. 6, 2023

(30) Foreign Application Priority Data

Dec. 30, 2021     (KR) ......................... 10-2021-0192038

(51) Int. Cl.
*G06F 3/06*          (2006.01)
*G06F 9/30*          (2018.01)
(52) U.S. Cl.
CPC ............ *G06F 3/064* (2013.01); *G06F 3/0679* (2013.01); *G06F 9/30029* (2013.01); *G06F 3/0604* (2013.01)
(58) Field of Classification Search
None
See application file for complete search history.

(56) References Cited

U.S. PATENT DOCUMENTS

| | | | | |
|---|---|---|---|---|
| 9,335,955 B2 | 5/2016 | Kim et al. | | |
| 2014/0025887 A1 | 1/2014 | Kim et al. | | |
| 2016/0357484 A1* | 12/2016 | Schaffert | ................. | G06F 8/654 |
| 2017/0220252 A1* | 8/2017 | Slindee | .................. | G06F 3/061 |
| 2019/0080127 A1* | 3/2019 | Yoshida | ............. | G06F 3/04162 |
| 2019/0319781 A1* | 10/2019 | Chhabra | ............... | G06F 3/0655 |
| 2020/0169382 A1* | 5/2020 | Factor | .................. | G06F 3/0641 |
| 2021/0064234 A1* | 3/2021 | Zhang | .................. | G06F 9/5016 |
| 2021/0103653 A1* | 4/2021 | Numata | ............... | G06F 3/0658 |

FOREIGN PATENT DOCUMENTS

KR          101925383 B1     12/2018

* cited by examiner

*Primary Examiner* — Jared I Rutz
*Assistant Examiner* — Alexander J Yoon
(74) *Attorney, Agent, or Firm* — Lempia Summerfield Katz LLC

(57)          ABSTRACT

An electronic device emulating nonvolatile memory includes: a first memory including a data block in which data is stored and a metadata block in which metadata relating to the data is stored; a second memory in which data to be used by the electronic device is stored; and a processor configured to manage data of the first memory and the second memory. The processor may generate a random value for distinguishing between first data and other data when the first data is stored in the first memory, include the random value in the first data and then store the first data in the data block, and store, in the second memory, a password value obtained by encrypting information on the first data based on the random value and a roll-back key.

12 Claims, 6 Drawing Sheets

ELECTRIC DEVICE AND METHOD FOR EMULATING A NON-VOLATILE MEMORY

CROSS-REFERENCE TO RELATED APPLICATION

This application claims priority to and the benefit of Korean Patent Application No. 10-2021-0192038, filed on Dec. 30, 2021, the entire contents of which are incorporated herein by reference.

FIELD OF TECHNOLOGY

Exemplary embodiments of the present disclosure relate to an electronic device and method for emulating nonvolatile memory in which data is managed by rolling back data stored therein.

BACKGROUND

Electrically erasable programmable read-only memory (EEPROM) is nonvolatile memory to which data can be electrically written and from which data can be electronically erased.

EEPROM is typically used as a memory that stores contents for a relatively long time once the contents are stored therein or memory for storing a set value, such as when important data that should not be deleted when power is off needs to be backed up.

However, the EEPROM has a characteristic in that only new data is read although a plurality of data has been stored in the EEPROM. Accordingly, it is required to newly add new data without using data that has been previously stored in the EEPROM.

The foregoing is intended merely to aid in the understanding of the background of the present disclosure, and is not intended to mean that the present disclosure falls within the purview of the related art that is already known to those having ordinary skill in the art.

SUMMARY

Various embodiments are directed to providing an electronic device and method for emulating nonvolatile memory, which can add data previously stored in nonvolatile memory, in particular, EEPROM as new data by rolling back the data.

In an embodiment, an electronic device emulating nonvolatile memory includes first memory including a data block in which data is stored and a metadata block in which metadata relating to the data is stored, second memory in which data to be used by the electronic device is stored, and a processor configured to manage data of the first memory and the second memory, wherein the processor generates a random value for distinguishing between first data and other data when the first data is stored in the first memory, includes the random value in the first data and then stores the first data in the data block, and stores, in the second memory, a password value obtained by encrypting information on the first data based on the random value and a roll-back key.

In an embodiment of the present disclosure, the processor may calculate the password value by performing an exclusive OR (XOR) on the random value and the roll-back key.

In an embodiment of the present disclosure, the processor may store, in the data block, the first data including the random value, may store the roll-back key in the metadata block, and may store the password value in a standby RAM area of the second memory.

In an embodiment of the present disclosure, the processor may sequentially store the first data in the data block based on ID information stored in the metadata block.

In an embodiment of the present disclosure, when receiving a use instruction for the first data that is existing data, the processor may read the first data stored in the data block based on the password value and the roll-back key and may add, to the data block, the first data that has been read as new data.

In an embodiment of the present disclosure, the processor may decrypt data based on the password value and the roll-back key, may search for a random value identical with a calculated result value, and may read the first data including the retrieved random value.

In an embodiment of the present disclosure, the processor may calculate the random value of the first data as the result value by performing an exclusive OR (XOR) on the password value and the roll-back key.

In an embodiment of the present disclosure, when the first data is added as new data, the processor may delete data of the oldest data block when an empty block is not present in the data block of the first memory, and may then store the first data as new data.

In an embodiment of the present disclosure, the nonvolatile memory may be electrically erasable programmable read-only memory (EEPROM).

In another embodiment, an operating method of an electronic device emulating nonvolatile memory includes: generating, by a processor, a random value for distinguishing between first data to be stored in a first memory and other data; storing, by the processor, the random value in a data block of the first memory by including the random value in the first data; encrypting, by the processor, information on the first data based on the random value and a roll-back key stored in a metadata block of the first memory; and storing, in a second memory, a password value calculated in the encrypting of the information.

In an embodiment of the present disclosure, in encrypting the information, the processor may calculate the password value of the first data by performing an exclusive OR (XOR) on the random value and the roll-back key.

In an embodiment of the present disclosure, the method may further include: decrypting, by the processor, information on the first data based on the password value stored in the second memory and the roll-back key in response to a reception of a use instruction for the first data; searching, by the processor, the first memory for a random value identical with a result value calculated in the decrypting of the information; and reading, by the processor, the first data including the retrieved random value.

In an embodiment of the present disclosure, in decrypting the information, the processor may calculate, as the result value, the random value included in the first data by performing an exclusive OR (XOR) on the password value and the roll-back key.

In an embodiment of the present disclosure, the method may further include: determining, by the processor, whether an empty block is present in the data block of the first memory before adding the first data that has been read as new data; and deleting, by the processor, the oldest data block if an empty block is not present and then storing the first data as new data.

According to an aspect, the present disclosure has effects in that it can reduce an execution time and increase the lifespan of EEPROM by enabling the existing data to be used by emulating the EEPROM so that data is divided, encrypted, and stored in nonvolatile memory, in particular, the EEPROM and data that has been previously stored in the EEPROM is rolled back by using a roll-back key.

According to another aspect of the present disclosure, stored data and encrypted data can be separated from each other and stored by using EEPROM and the standby RAM area having a low voltage. Data can be effectively managed in a way that the uniqueness of each datum can be secured by encrypting the datum through a logic operation and each datum can be easily decrypted.

BRIEF DESCRIPTION OF THE DRAWINGS

In order that the disclosure may be well understood, there are now described various forms thereof, given by way of example, reference being made to the accompanying drawings, in which.

Figure 1:
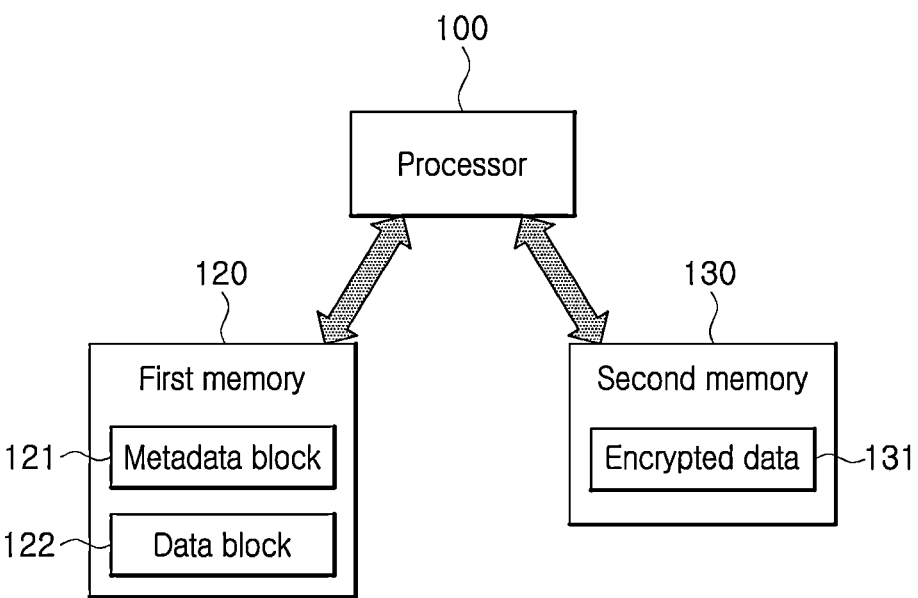
FIG. 1 is a block diagram of an example electronic device that emulates nonvolatile memory according to an embodiment of the present disclosure.

It should be understood that the drawings are not necessarily to scale, presenting a somewhat simplified representation of various features illustrative of the basic principles of the disclosure. The specific design features of the present disclosure, including, for example, specific dimensions, orientations, locations, and shapes can be determined in part by the particular intended application and use environment.

In the figures, reference numerals refer to the same or equivalent parts of the present disclosure throughout the several figures of the drawing.

DETAILED DESCRIPTION

Hereinafter, embodiments of the present disclosure are described in detail with reference to the accompanying drawings so that a person having ordinary knowledge in the art to which the present disclosure pertains may easily practice the embodiments. However, the present disclosure may be implemented in various different forms and is not limited to the embodiments described herein. Furthermore, in the drawings, in order to clearly describe the present disclosure, certain parts not related to the description may be omitted, and similar reference numbers may be used to refer to similar constituent components throughout the specification.

Throughout the specification, when it is described that any part "includes" any element, this means that unless described otherwise, the any part may further include another element without excluding another element.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure. Furthermore, each of the blocks, units and/or modules may be implemented by dedicated hardware or a combination of dedicated hardware for performing some functions and a processor for performing another function (for example, one or more programmed processors and related circuits).

An implementation described in this specification may be realized as a method or process, an apparatus, a software program, a data stream or a signal, for example. Although embodiments of the present disclosure are generally described below in the context of a single form of an implementation (e.g., discussed as only a method), an implementation of a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor may include a communication device, such as a computer, a cell phone, a mobile phone/personal digital assistant ("PDA") and another device which facilitates the communication of information between end-users.

FIG. 1 is a block diagram of an example electronic device that emulates nonvolatile memory, according to an embodiment.

As illustrated in FIG. 1, the electronic device includes a processor 110, a first memory 120, and a second memory 130.

The processor 110 may be included in a main controller (ECU) of a vehicle, and may be configured to control the vehicle and monitor the state of the vehicle based on received data.

Furthermore, the processor 110 may be configured to control the data input and output of the first memory 120 and the second memory 130, and to monitor the state thereof.

The processor 110 may be configured to control reading of the data from the first memory 120 and writing of the data to the first memory 120. In an example, the processor 110 may be configured to store data for roll-back of data and/or to control retrieval of the data.

In an example, when the existing data is used, the processor 110 may add specific data, among the existing data that has been previously stored by using roll-back, as new data, by rolling back the specific data. The processor 110 may operate to read new data among the data stored in the first memory 120, and may enable the existing data to be used through roll-back even though the existing data may not be newly written, by storing the existing data as the new data by roll-back the existing data.

The first memory 120 may comprise nonvolatile memory capable of electrically writing and deleting data. In particular, in an example, the first memory 120 may comprise Electrically erasable programmable read-only memory (EEPROM). In the present disclosure, an example in which nonvolatile memory is EEPROM is generally described, but the present disclosure is not limited thereto.

In an embodiment, the first memory 120 stores data by dividing blocks thereof into a metadata block 121 including information for identifying the existing data and new data and a data block 122 in which data is stored in implementing EEPROM emulation capable of roll-back.

The first memory 120 may include a plurality of blocks, each block comprising a respective metadata block 121 and a respective data block 122. In other words, the metadata block 121 and the data block 122 may be formed in each block, among a plurality of blocks in the first memory 120, and data may be stored therein.

The metadata block 121 may store i) identification (ID) information to distinguish between old data and new data and ii) a roll-back key for roll-back of the data.

The data block 122 may store data, such as status diagnosis information and failure information of a vehicle.

The second memory 130 may be a random-access memory (RAM) that may operate at a low voltage when power is not supplied to the electronic device. The second memory 130 may include a standby RAM area. The processor 110 may be configured to store, in the standby RAM area of the second memory 130, data to be used by the electronic device.

The second memory 130 may store encrypted data 131. The encrypted data 131 may be stored in the standby RAM area of the second memory 130.

In an example, the encrypted data 131 is data that is generated in a process of encrypting or decrypting information that is related to data stored in the first memory 120 for roll-back of the stored data. For example, the encrypted data 131 may include a password value calculated, in an encryption operation, based on a random value of data and a roll-back key.

Figure 2:
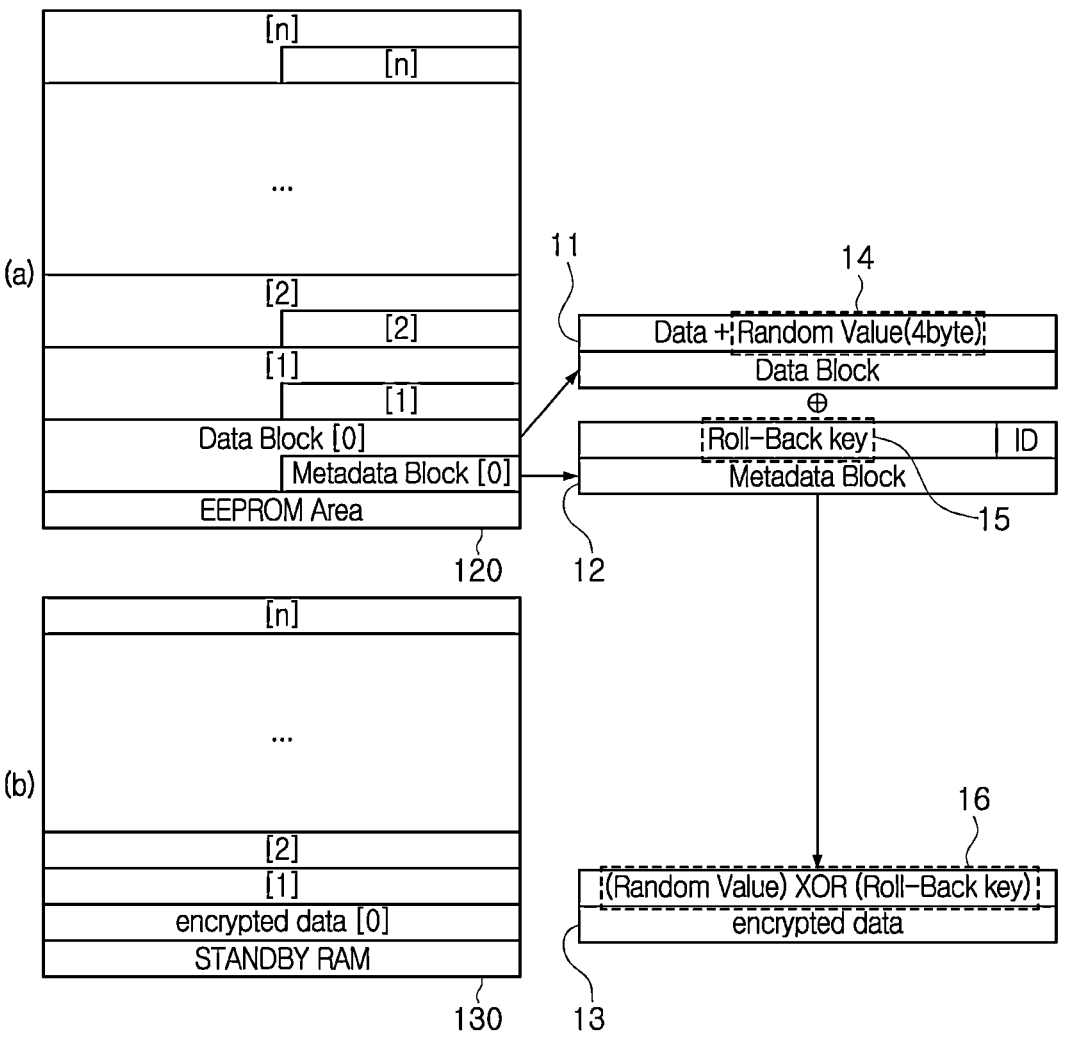
FIG. 2 is a diagram of an example memory structure of the electronic device that emulates nonvolatile memory according to an embodiment of the present disclosure.

FIG. 2 is a diagram of an example memory structure of the first memory 120 and the second memory 130 of the electronic device of FIG. 1, according to an embodiment.

As illustrated in section (a) of FIG. 2, the first memory 120 includes an EEPROM area of EEPROM, that is, a space for storage.

A metadata block 121, illustrated in FIG. 2 as a block 12, and a data block 122, illustrated in FIG. 2 as a block 11, may form one block 50 in the first memory 120. The block 50 may be formed in the EEPROM area of the first memory 120. The EEPROM area of the first memory 120 may include a plurality of blocks 50 (e.g., blocks 51 to 59).

In one embodiment, the EEPROM area of the first memory 120 includes a first block 51 to an n-th block 59. The first block 51 includes a first metadata block and a first data block. The second block 52 includes a second metadata block and a second data block, and so on. The n-th block 59 includes an n-th metadata block and an n-th data block.

The data block 11 includes data for vehicle failure and status information and a random value 14.

The random value 14 may be a value for identifying the data block 11. In an example, the random value 14 is a value for indicating to which data block, among a plurality of data blocks included in the first memory 120, a current data block corresponds. The random value 14 may have the size of about 4 bytes, for example.

In an embodiment, the random value 14 is included in data and stored in the data block 11.

The metadata block 12 includes ID information indicative of an order thereof and a roll-back key 15 that is used for encryption and decryption. The ID information may be the number of the metadata block 12. The roll-back key 15 may be a key value for executing a roll-back operation of data.

As illustrated in section (b) of FIG. 2, the second memory 130 may include a standby RAM area. The RAM area of the second memory 130 may be maintained at a low voltage even when power is not supplied to the electronic device.

The standby RAM area of the second memory 120 includes encrypted data 131, illustrated in FIG. 2 as a block 13.

The encrypted data 13 may include a plurality of encrypted data blocks 60.

In an embodiment, the encrypted data 13 includes a password value 16 that is calculated by performing an XOR operation on the random value 14 of the data block 11 and the roll-back key 15 of the metadata block 12.

In an example, when data of the first memory 120 is stored so that the data can be rolled back, the processor 110 sequentially stores the data in the data block 11 based on ID information included in the metadata block 12.

In order to distinguish between the stored data and other data, the processor 110 generates the random value 14 for the stored data. In an example, the processor 110 includes the generated random value 14 in the stored data, for example by appending the random value 14 at end of the stored data in the size of 4 bytes. The processor 110 then stores, in the data block 11, the data including the random value 14.

Furthermore, the processor 110 encrypts information related to data that will be stored. For example, the processor 110 encrypts the information by performing an XOR operation of the random value 14 of the data block 11 and the roll-back key 15 of the metadata block 12. In an example, the processor 110 stores a password value 16, that is, a result value of the encryption, in the encrypted data 131 of the second memory 130.

Accordingly, the electronic device according to an embodiment secure the uniqueness of each datum through a random value and encryption with respect to data stored therein.

Figure 3:
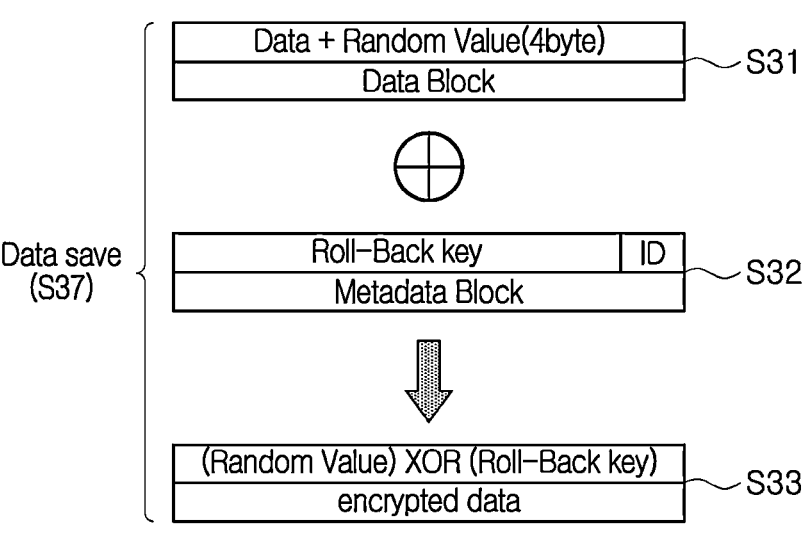
FIG. 3 is a diagram for describing a roll-back method performed by the electronic device that emulates nonvolatile memory according to an embodiment of the present disclosure.
Figure 3:
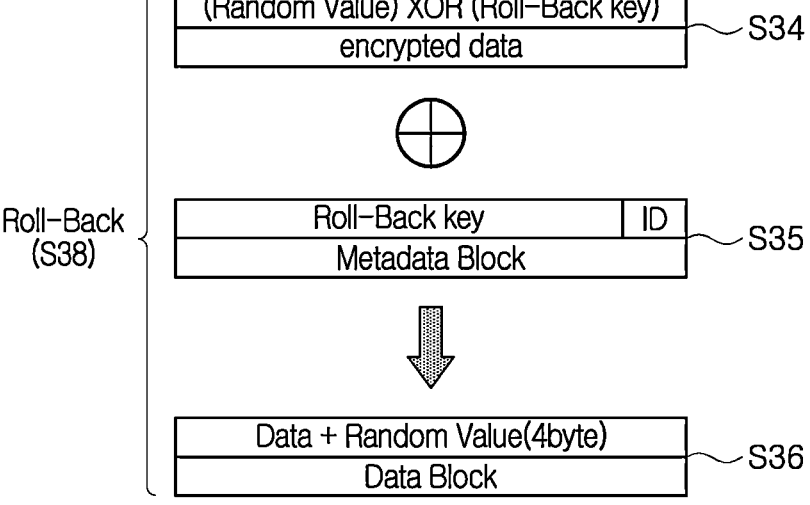

FIG. 3 is a diagram for describing a roll-back method of the electronic device of FIG. 1, according to an embodiment of the present disclosure.

As illustrated in FIG. 3, in implementing emulation for rolling back data that has been stored in the first memory 120, the processor 110 may operate to perform step S37 (data save) of encrypting information related to the data and may store the encrypted information in the first memory 120. The processor 110 may also operate to perform step S38 (roll-back) of adding the stored data as new data by rolling back the stored data.

In an example, when data is stored in the first memory 120, the processor sequentially stores the data in the data block 11 based on ID information that is stored in the metadata block 12 of the first memory 120.

The processor 110 may generate the random value 14 for distinguishing between the stored data and other data and indicating at which data block corresponding data is stored.

The processor 110 may include the generated random value 14 in the stored data, and may stores, in the data block 11, the data including the random value 14 (S31).

The processor 110 reads the roll-back key 15 stored in the metadata block 12, and performs encryption through an XOR operation of the random value 14 and the roll-back key 15 (S32).

In an embodiment, the roll-back key 15 is a key value for the roll-back of data, and it is used in an encryption and decryption process and stored in the metadata block 12.

The processor 110 may store, in the encrypted data 131 of the second memory 130, the password value 16 that is calculated by performing XOR of the random value 14 and the roll-back key 15 (S33).

The processor 110 may store the data in the first memory 120, and may store the password value 16 in the second memory 130 separately from the data. The processor 110 may store the password value 16 in the standby RAM area of the second memory 130 that is maintained at a low voltage when power is not supplied to the second memory 130 so that the password value 16 is not deleted.

In an example, when data is stored in the first memory 120, the processor 110 sequentially stores the data for each data block based on ID information as described above, but repeats generating the password value 16 for the stored data and storing the generated password value in the encrypted data 131 of the second memory 130.

With respect to data that has been previously stored in the first memory 120, the processor 110 may add specific data, among the existing data, as new data by rolling back the specific data through the roll-back step S38.

The processor 110 may read the password value 16 stored in the encrypted data 131 of the second memory 130 (S34), and may decrypt data by performing an XOR operation on the password value 16 and the roll-back key 15 stored in metadata block 12 (S35).

The processor 110 may obtain the random value 14 of the data by performing an XOR operation on the roll-back key 15 and the password value 16, that is, a result value of the XOR operation of the random value 14 and the roll-back key 15.

Accordingly, the processor 110 may check the random value 14 based on the result value calculated when the data is decrypted. That is, the processor 110 may check whether the result value calculated in the decryption process is any one random value among the existing data.

The processor 110 may search the data block 11 for the result value calculated in the decryption process, search data stored in the data block 11 for a random value identical with the result value, and read data including the random value identical with the retrieved result value (S36).

The processor 110 may store the read data in the data block 11 of the first memory 120 as new data.

Accordingly, the processor 110 may use data stored in the first memory 120 as new data by rolling back the stored data.

Figure 4:
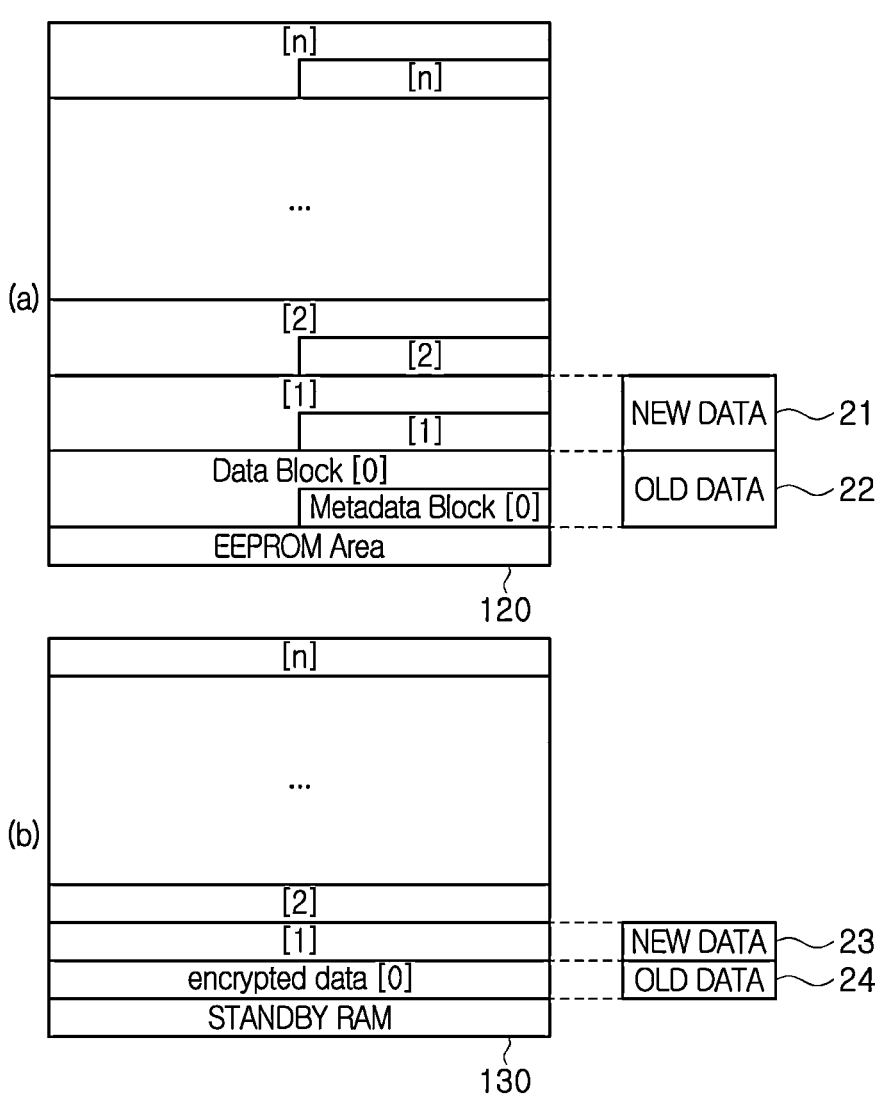
FIG. 4 is a diagram for describing a method of managing data by the electronic device that emulates nonvolatile memory according to an embodiment of the present disclosure.

FIG. 4 is a diagram for describing data roll-back that may be performed by the electronic device of FIG. 1, according to an embodiment of the present disclosure.

In an example, when data is stored in the first memory 120, as illustrated in section (a) of FIG. 4, the processor 110 may sequentially store the data in the blocks 50, each block 50 including a data block 11 and a metadata block 12, in the EEPROM area of the first memory 120, by considering the roll-back of the data.

For example, the processor 110 may sequentially store the data in the blocks 50 based on ID information of the metadata block 12 of the first memory 120.

In an example, when first data 22 is stored in the first block 51 and second data 21 is stored in the second block 52, the processor 110 determines that the first data 22 of the first block 51 is the existing data (old data), and determines that the second data 21 of the second block 52 is new data.

The processor 110 may read the second data, that is, new data, and may perform a specific operation on the second data. Accordingly, if the first data is to be used, the processor 110 may add, as the new data, the first data that has been previously stored in the first memory 120 so that the first data is rolled back by emulating the first memory 120, may read the first data that has been changed into the new data, and may perform an operation on the first data that has been read.

As illustrated in section (b) of FIG. 4, the processor 110 may store data in the standby RAM area of the second memory 120 including the plurality of encrypted data blocks 60.

The processor 110 may distinguish between new data 23 and the existing data (old data) 24 based on an order in which the data is stored.

When the data is stored in all of the plurality of blocks of the first memory 120, the processor 110 may delete the blocks starting from the oldest block and store the new data in the blocks. When the encrypted data 131 is stored in the plurality of encrypted data blocks of the second memory 130, the processor 110 may delete the stored encrypted data in order, starting from the oldest one, and may store new encrypted data.

Figure 5:
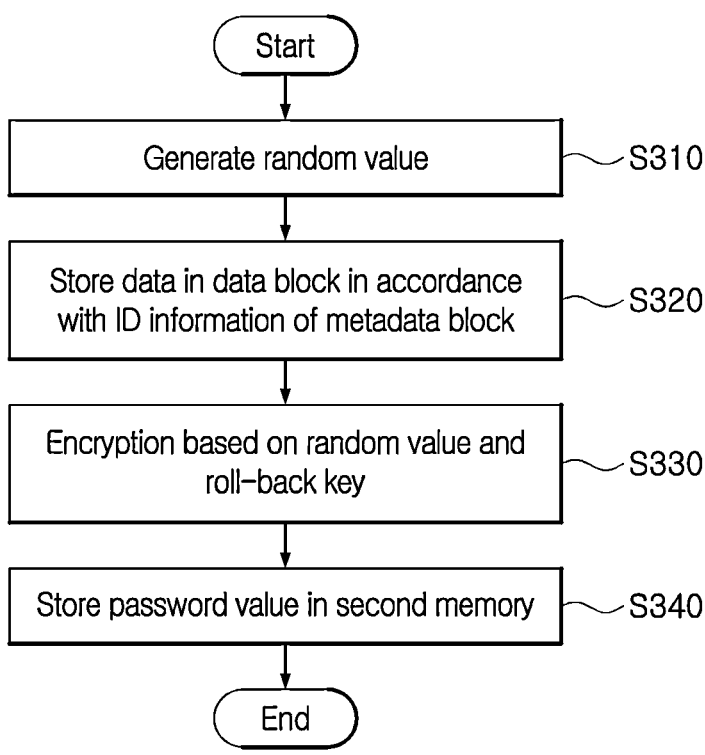
FIG. 5 is a flowchart of a data encryption method for the roll-back of the electronic device that emulates nonvolatile memory according to an embodiment of the present disclosure.

FIG. 5 is a flowchart illustrating a method for encrypting data for a roll-back that may be performed by the electronic device of FIG. 1, according to an embodiment.

As illustrated in FIG. 5, when data is stored in the data block 11 of the first memory 120, the processor 110 generates a random value 14 for the data to be stored (S310).

After including the random value 14 in the data, for example by appending the random value 14 at the end of the data, the processor 110 may sequentially store the data in the data block 11 in accordance with ID information of the metadata block 12 (S320).

The processor 110 may generate the password value 16 by performing an XOR operation on the random value 14 of the stored data and the roll-back key 15 of metadata (S330). Accordingly, the processor 110 can secure the uniqueness of the stored data through the logic operation.

The processor 110 may store the generated password value 16 in the encrypted data 131 of the second memory 130 (S340).

When data is stored in the first data block of the first block 51, the processor 110 may store the password value 16 in the encrypted data 131 (block 13) of the second memory 130 in accordance with the first data block.

When data is added, the processor 110 may store a plurality of data in the first memory 120 in blocks by repeating generating the random value 14, adding the random value 14 to the data, encrypting the data based on the random value 14 and the roll-back key 15, and storing the password value 16 for the data in the encrypted data 131 (block 13) of the second memory 130 separately from the data.

Figure 6:
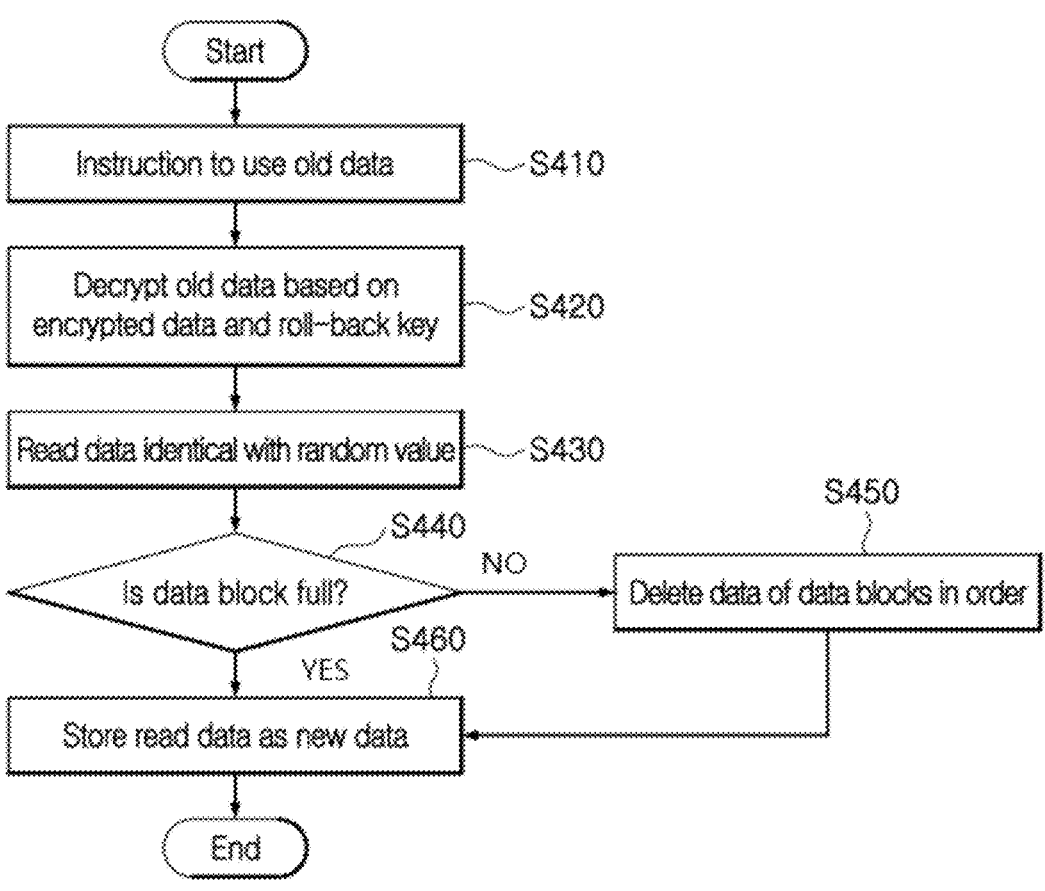
FIG. 6 is a flowchart illustrating a method of rolling back data by the electronic device that emulates nonvolatile memory according to an embodiment of the present disclosure.

FIG. 6 is a flowchart of a method for rolling back data that may be performed by the electronic device of FIG. 1, according to an embodiment.

As illustrated in FIG. 6, when receiving an instruction to use the existing data that has been stored in the first memory 120 (S410), the processor 110 may read, from the second memory 120, the encrypted data 131 (block 13) for the existing data (old data) of the first memory 120.

As described above, the processor 110 may read the password value 16 that has been stored in the encrypted data 13 of the second memory 130, and may read the roll-back key 15 that has been stored in the metadata block 121 (block 12) of the first memory 120.

The processor 110 may decrypt the data by calculating a result value of the data. The processor 110 may calculate the result value of the data by performing an XOR operation on the password value 16 and the roll-back key 15 (S420).

The processor 110 may search for a random value identical with the result value by searching the data block 11 of the first memory 120 for the result value according to the decryption. When the random value identical with the result value is present, the processor 110 may read data including the random value (S430).

In this case, the processor 110 may decrypt the password value 16 calculated as the results of an XOR operation on the random value 14 and the roll-back key 15, by again performing an XOR operation of the password value 16 and the roll-back key 15. The random value 14 may thus be calculated as a result value of the XOR operation that has been performed again. That is, the result value is the random value 14 of data to be read.

Before storing the read existing data, the processor 110 may check whether all of the plurality of data blocks of the first memory 120 are full of data, that is, whether an empty data block is present (S440).

If an empty data block is present, the processor 110 may add the read existing data to the empty data block as new data (S460).

If all of the data blocks are full of data, the processor 110 may delete the data of the data blocks in order, starting from data that has been stored first (S450).

The processor 110 may store the read existing data in the data block as new data (S460).

Accordingly, the processor 110 can use the existing data as new data by storing a plurality of data in EEPROM, that is, the first memory 120, but emulating the first memory 120 so that the existing data that has been previously stored in the first memory 120 is rolled back based on a characteristic in which only new data is read.

As described above, embodiments of the present disclosure may reduce execution time and increase the lifespan of EEPROM by enabling the existing data to be used by emulating the EEPROM so that data is divided, encrypted, and stored in nonvolatile memory, in particular, the EEPROM and data that has been previously stored in the EEPROM is rolled back by using a roll-back key.

Furthermore, according to embodiments of the present disclosure, stored data and encrypted data can be separated from each other and stored by using EEPROM and the standby RAM area having a low voltage. Data can be effectively managed in a way that the uniqueness of each datum can be secured by encrypting the datum through a logic operation and each datum can be easily decrypted.

The embodiments of the present disclosure have been described in detail, but the scope of rights of the present disclosure is not limited thereto. A variety of modifications and changes using the basic concept of the present disclosure defined in the appended claims are also included in the scope of rights of the present disclosure.

What is claimed is:

1. An electronic device emulating nonvolatile memory, the electronic device comprising:
   a first memory comprising a data block in which data is stored and a metadata block in which metadata relating to the data is stored;
   a second memory in which encryption data is stored; and
   a processor configured to manage data of the first memory and the second memory, wherein the processor is configured to:
   generate a random value for first data to be stored in the first memory,
   include the random value in the first data and store the first data in the data block, wherein the random value distinguishes the first data stored in the first memory from other data stored in the first memory, and
   store, in the second memory, a password value obtained by encrypting information on the first data based on the random value and a roll-back key corresponding to the first data, wherein the processor is configured to calculate the password value by performing an exclusive OR (XOR) operation on the random value and the roll-back key, and
   in response to receiving a use instruction for the first data that is stored in the data block, i) read the first data stored in the data block and ii) add, to the data block, the first data, that has been read, as new data,
   wherein the processor is configured to:
   store, in the data block, the first data comprising the random value,
   store the roll-back key in the metadata block, and
   store the password value in a standby random-access memory (RAM) area of the second memory.

2. The electronic device of claim 1, wherein the processor is configured to sequentially store the first data in the data block based on identification (ID) information stored in the metadata block.

3. The electronic device of claim 1, wherein the processor is configured to, in response to receiving the use instruction for the first data, read the first data stored in the data block based on the password value and the roll-back key.

4. The electronic device of claim 3, wherein the processor is configured to:
   decrypt information on the first data based on the password value and the roll-back key,
   search the first memory to identify the first data comprising the random value identical to a result value calculated in decrypting the information, and
   read the first data comprising the random value.

5. The electronic device of claim 4, wherein the processor is configured to calculate the random value of the first data as the result value by performing an exclusive OR (XOR) on the password value and the roll-back key.

6. The electronic device of claim 3, wherein the processor is configured to, when the first data is added as the new data, i) delete data of an oldest data block when an empty block is not present in the data block of the first memory and ii) store the first data as the new data.

7. The electronic device of claim 1, wherein the nonvolatile memory is electrically erasable programmable read-only memory (EEPROM).

8. A method for operating an electronic device emulating nonvolatile memory, the method comprising:
   generating, by a processor, a random value for first data to be stored in a first memory;
   storing, by the processor, the random value in a data block of the first memory by including the random value in the first data, wherein the random value distinguishes the first data stored in the first memory from other data stored in the first memory;

encrypting, by the processor, information on the first data based on the random value and a roll-back key stored in a metadata block of the first memory;

storing, by the processor a second memory, a password value calculated in the encrypting of the information, wherein the password value of the first data is calculated by performing an exclusive OR (XOR) of the random value and the roll-back key; and in response to receiving a use instruction for the first data, i) reading, by the processor, the first data stored in the data block and ii) adding, by the processor to the data block, the first data that has been read, as new data, wherein the processor is configured to:

store, in the data block, the first data comprising the random value, store the roll-back key in the metadata block, and store the password value in a standby random-access memory (RAM) area of the second memory.

9. The method of claim 8, wherein reading, by the processor, the first data stored in the data block includes:

decrypting, by the processor, information on the first data based on the password value stored in the second memory and the roll-back key;

searching, by the processor, the first memory to identify the first data comprising the random value identical with a result value calculated in the decrypting of the information; and reading, by the processor, the first data comprising the random value.

10. The method of claim 9, wherein in decrypting the information, the processor calculates, as the result value, the random value included in the first data by performing an exclusive OR (XOR) on the password value and the roll-back key.

11. The method of claim 9, wherein adding, by the processor to the data block, the first data that has been read, as new data includes:

determining, by the processor, whether an empty block is present in the data block of the first memory before adding the first data that has been read as the new data; and deleting, by the processor, an oldest data block if an empty block is not present and then storing the first data as the new data.

12. The method of claim 8, wherein the nonvolatile memory is electrically erasable programmable read-only memory (EEPROM).

* * * * *